March 12, 1935.  A. O. AUSTIN  1,994,266
INSULATOR
Filed May 18, 1931  2 Sheets-Sheet 1
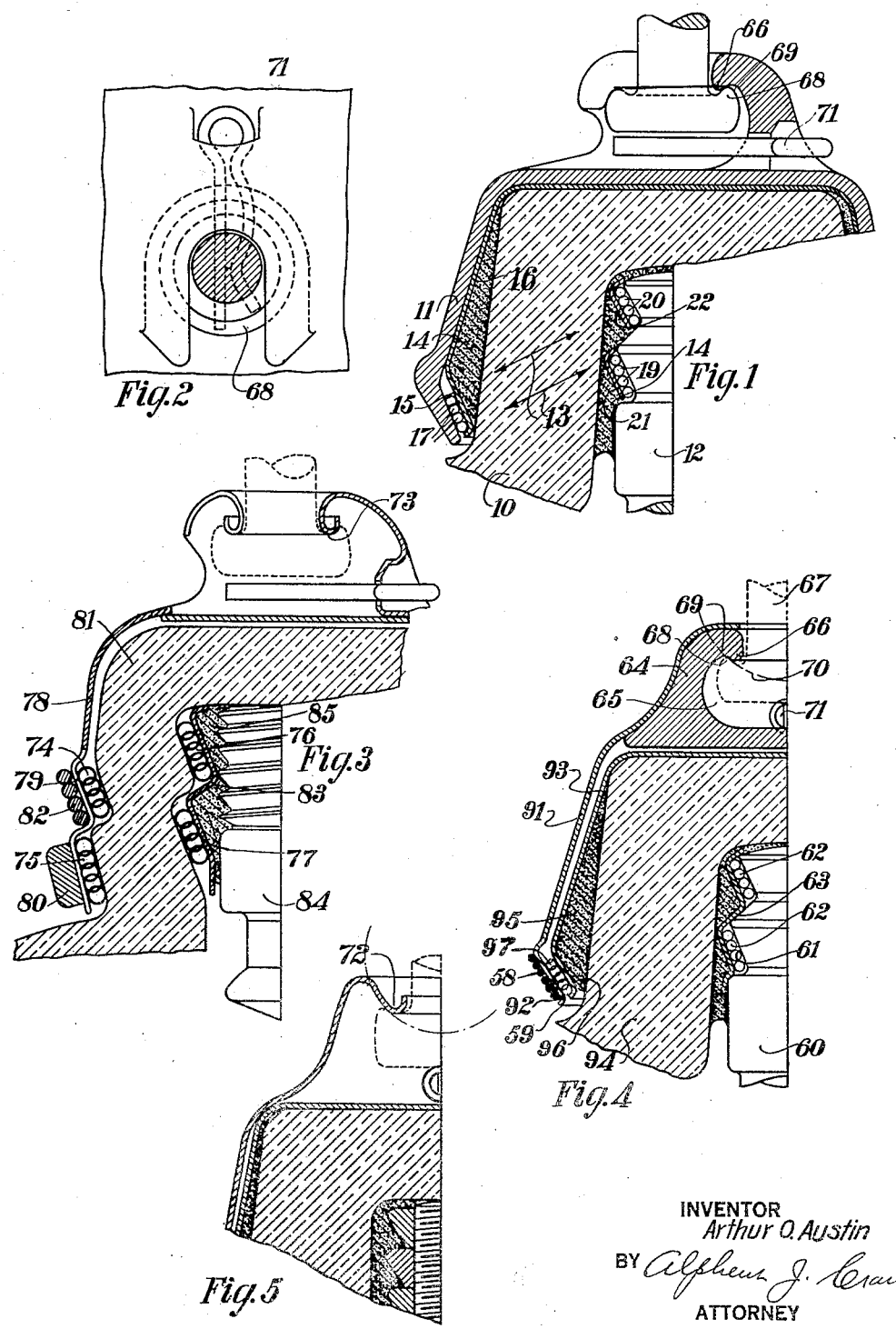
INVENTOR
Arthur O. Austin
BY
ATTORNEY March 12, 1935.    A. O. AUSTIN    1,994,266
INSULATOR
Filed May 18, 1931    2 Sheets-Sheet 2
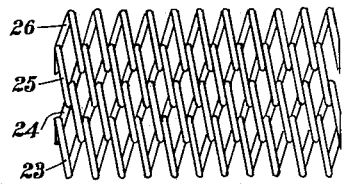
Fig. 6    Fig. 7
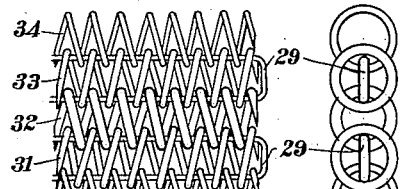
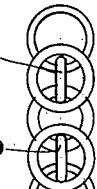
Fig. 8    Fig. 9
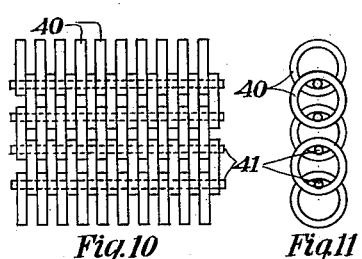
Fig. 10    Fig. 11
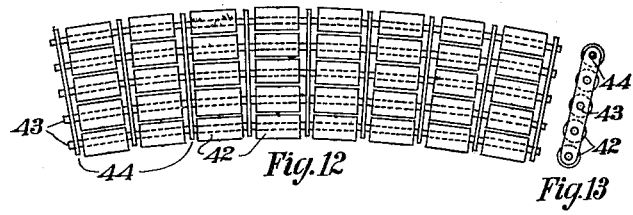
Fig. 12    Fig. 13
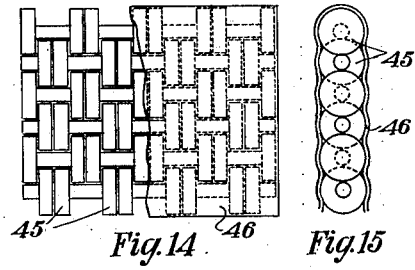
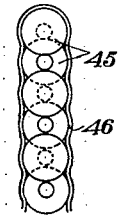
Fig. 14    Fig. 15
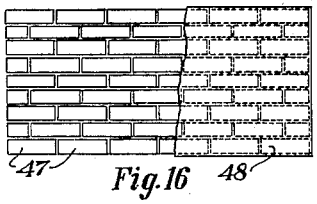
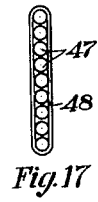
Fig. 16    Fig. 17
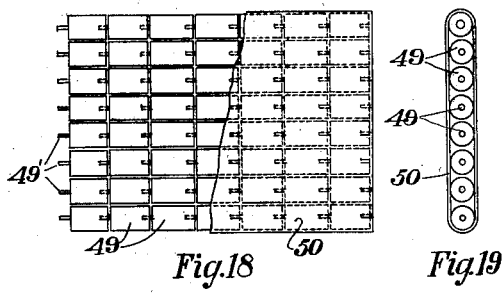
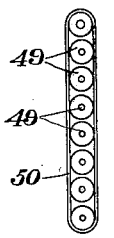
Fig. 18    Fig. 19
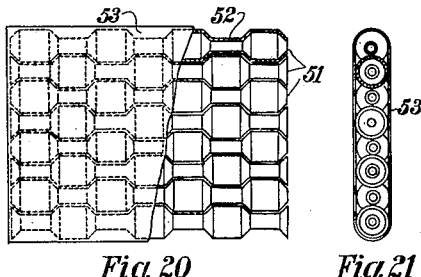
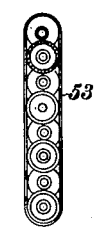
Fig. 20    Fig. 21
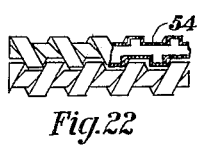
Fig. 22    Fig. 23
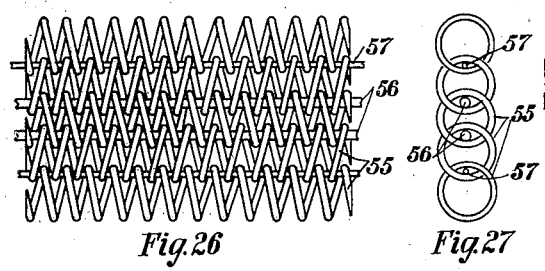
Fig. 26    Fig. 27
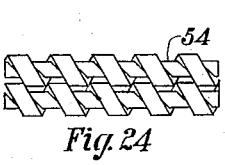
Fig. 24    Fig. 25
INVENTOR
Arthur O. Austin.
BY Alpheus J. Crane
ATTORNEY Patented Mar. 12, 1935

1,994,266

UNITED STATES PATENT OFFICE 1,994,266

INSULATOR

Arthur O. Austin, near Barberton, Ohio, assignor, by mesne assignments, to The Ohio Brass Company, Mansfield, Ohio, a corporation of New Jersey Application May 18, 1931, Serial No. 538,046

4 Claims. (Cl. 173—318)

This invention relates to insulators and especially insulators subjected to high mechanical loads, and has for one of its objects the provision of means for compensating for strains set up in the insulator parts by variations in the load on the insulator and by temperature changes.

A further object is to provide compensating means interposed between parts of the insulator which will permit relative movement of the parts to compensate for changes in load and temperature and which will permit restoration of the parts when the original condition returns.

Another object is to provide a construction which will permit of the use of an insulator cap formed of relatively thin material such that the distortion of the cap under load would be too great if compensating means were not provided.

A further object is to provide a cap of thin material having a socket of sufficient strength to withstand heavy loads.

A further object of the invention is to provide an insulator which is economical to manufacture and which shall be of improved construction and operation.

Other objects and advantages will appear from the following description.

The invention is exemplified by the combination and arrangement of parts shown in the accompanying drawings and described in the following specification, and it is more particularly pointed out in the appended claims.

The invention covered by this application is in the nature of an improvement over the invention shown and claimed generically in my co-pending application Serial No. 453,180, filed May 17, 1930.

In the drawings:

Fig. 1 is a fragmentary, vertical, sectional view of an insulator having one embodiment of the present invention applied thereto.

Fig. 2 is a top plan view of the socket portion of the cap shown in Fig. 1.

Figs. 3, 4 and 5 are views similar to Fig. 1 showing modified forms of the invention.

Figs. 6, 8, 10, 12, 14, 16, 18, 20, 22, 24 and 26 are plan views of various forms of resilient mats comprised in the invention.

Figs. 7, 9, 11, 13, 15, 17, 19, 21, 23, 25 and 27 are end views of the mats shown in Figs. 6, 8, 10, 12, 14, 16, 18, 20, 22, 24 and 26.

It has been common practice to cement metal parts to porcelain or other dielectric members in making up suspension and other types of insulators. Where the insulators are placed under heavy loads, the material in the dielectric members is distorted under the stress. The distortion may be such that the fragile dielectric will fail. While a complete mechanical failure may not result, a crack in the dielectric will result in an electrical failure which may, in turn, destroy the mechanical construction due to the gases formed, should a power arc follow through the fault.

The modulus of elasticity of dielectrics generally used for insulators is approximately three million pounds. The modulus of elasticity of the metal parts is approximately ten times this figure. The ultimate strength of the dielectric in tension and shear is from 2500 to 3000 pounds while the ultimate strength of the metal parts may, of course, be exceedingly high. In practice, however, the metal as well as the dielectric parts distort under load. Even though distortion of the dielectric is neglected, the distortion of the metal parts will permit sufficient movement to produce failure of the dielectric under stresses much below the ultimate mechanical strength in the metal. In fact, the metal can seldom be worked at over twenty to thirty percent of its ultimate strength even in developing the ultimate strength in the insulator. This is due to the elastic stretch in the metal. This elastic stretch or distortion increases as the effective section of the metal is decreased. In order to prevent serious distortion in the metal, it is therefore necessary to use heavy parts. Since, however, the metal has approximately twice the linear coefficient of expansion for changes in temperature that the dielectric has, it is evident that if the metal parts are made too large and heavy, stress set up during changes in temperature may cause failure of the dielectric.

One method of compensating for the distortion in the metal and the dielectric due to thermal expansion and load has been to give the parts a wedging shape and to allow the parts to slip relative to each other to take up looseness. There is a serious difficulty, however, in this arrangement as the coefficient of friction in the ordinary types of construction is appreciable, and tends to prevent the slipping of the parts when needed to compensate for distortion. In order to overcome this difficulty, the angle of slope has to be small so that slipping and compensation will take place before the dielectric is ruptured, owing to the distortion in metal of the dielectric. If the wedging angle is sharp enough to permit ready slipping to compensate for distortion, the friction between the parts tends to prevent their return to normal position when the condition that produced the distortion is removed. Therefore, the steep angle, due to the coefficient of friction, is a disadvantage and tends to retain the parts under stress after the load is removed. This stress combined with a stress set up at low temperature due to the difference in the linear coefficients of expansion of the metal and the dielectric may cause a rupture of the dielectric under even mild conditions. Where the friction can be eliminated or reduced to practically zero, the parts will tend to assume a normal position with a release of load.

In my improved construction, the coefficient of friction is materially reduced, permitting of a wide angle for the wedging action and, in addition, resiliency is provided which will taper off the stress and reduce the danger of shear on either side of the zone of maximum stress. The compensating means may be applied either to the outside metal parts or the inside metal parts or upon the surface of the dielectric itself, particularly where the resiliency in the parts is used to limit the stress or where the parts themselves, making the bearing surfaces, are limited as to the amount of stress which may be transmitted so that the dielectric will not be endangered.

The invention may be used together with constructions shown in previous patents in which the stress is tapered by slotting the metal parts or by the use of materials of low linear coefficient of expansion for reducing the thermal stress. The invention comprises a bearing surface to which a large number of rollers or springs or their equivalents are applied. In the past the difficulty of providing a large enough bearing surface without greatly increasing the size and cost of the parts has been a limiting factor. With my improved construction, however, it is possible to provide a bearing surface which will compensate for distortion of the parts under load but which will permit a return of the parts with a minimum amount of residual stress and which, at the same time, will permit of a control of the stress throughout the zone of bearing. Owing to the reduction of the coefficient of friction to a very low value, the rather flat angle of bearing will not only tend to restore the metal parts upon relief of the load, but will tend to relieve them from thermal stress as the parts will be lifted by the bearing surfaces under thermal contraction, in a manner similar to their operation upon a reduction in the load.

In the form of the invention shown in Fig. 1, a dielectric member 10 is provided with a cap 11 and pin 12. The main thrust on the cap is produced along the lines 13; the space between the insulator 10 and the metal fittings being filled with cement 14. A surface 15 is in contact with a series of rollers or springs 17. When tension is applied on the pin 12, there will be a pull in the reverse direction on the cap 11 tending to lift it. By using the proper slope of the angle of the bearing surface 15 with respect to the axis of the insulator, it is possible to compensate for the distortion in the dielectric member 10 and in the cap member 11, as well as in the cement 14 and any of the other parts making up the strut. The rolling members 17 permit the surface 15 to move downward with respect to the member 11. This moves the bearing surface inward as well as downward with respect to the cap member 11, thereby compensating for any radial distortion of the parts. While it is possible for the bearing members 17 to be placed in direct contact with the cement or if desired against a porcelain or dielectric surface, the cement is likely to be crushed and the rolling action may be seriously interfered with. Where the bearing members are allowed to bear directly against the cement, the space between the rollers and cement is generally filled with wax during assembly and until the cement hardens so as to leave only the desired surface in contact with the cement. This wax may be melted out at a later time if desired.

Another method of assembly is to cover the bearing surface of the rollers with a thin foil or a bearing metal 16. The sheet 16 not only prevents the cement from making a rigid mass out of the rolling members 17 but also provides a good bearing surface between the cement and the rolling members, so that the cement will not be broken up by a shift of the parts. The member 16 may be made of copper, stainless steel or other ferrous alloy or suitable material. Where this material is corrugated in a vertical direction, it may be readily fitted into the conical position. The vertical grooves or ridges will not only lock the material into the cement firmly but, in addition, will provide radial resiliency and permit radial movement of the sheet. One difficulty in the past in providing a resilient or compensated construction has been in the excessive cost of the parts and the danger of producing a structure that might cause mechanical failure due to the softening or collapse of the metal parts in case of a short circuit.

With the construction shown, it is possible to provide not only compensating surfaces having the equivalent of an exceedingly low coefficient of friction, but also having resiliency. This can be accomplished at a slight increase in cost over previous constructions and without materially changing the size of the parts. The same type of construction may be applied also to the pin, in which case the rolling members 19 and 20 may be covered with an envelope 21 and 22 or the rolling members may bear directly upon the cement provided the cement is hard enough to withstand the necessary pressure.

Figs. 6 and 7 show one form of roller bearing mat for use between the bearing surfaces in which helical members 23, 24, 25 and 26 are so proportioned that they may be threaded into each other. The construction is such that a plate resting upon the surface of the mat may be readily rolled at right angles to the axes of the helices, and the mat may be readily bent in the form of a frustrum to conform with the surface in the cap or pin. If properly proportioned, the members may be made so that they will hold each other in proper relation in a transverse direction so that little or no attention need be given to holding them in proper alinement during assembly in the insulator. Where the various members are made in the form of helical springs, they may be given the desired rigidity. It is also possible to vary the strength of the various members in the make-up of the mat so as to grade the pressure over the bearing surface. In general, this will be tapered off by using fewer turns or smaller wire near the edges of the mat than at the center so as to reduce the shear in the dielectric.

In the form of mat shown in Figs. 8 and 9 the adjacent helical members are reversely wound to permit them to mesh together without threading them through each other, as in Figs. 6 and 7. Where this type of construction is used, it is generally preferable to use key wires 29 to lock the various helices 30, 31, 32, 33 and 34 together. The locking members 29 may be turned over at the end or may be made continuous. Where these are given the proper length, they will permit the mat to be placed in any zone desired, and a bearing cover 16 provided for the rollers. The cover 16 may be expanded into position by any convenient method, such as expansion of a rubber block under pressure or by hydraulic means.

By grading the resiliency of the mat, the stress transmitted from one member to another may be graded, thus avoiding shear in the dielectric due to a sudden break in the force to which it is subjected. The grading in the mat may be effected in a variety of ways, as by grading the size of the wire of which the helices are formed, as shown in Fig. 9, or by grading the spacing of the convolutions, as shown in Fig. 28. It is not necessary that helical interlocking members be used for the roller mat but it is possible to secure a similar result by using a series of small rings or washers 40, as shown in Figs. 10 and 11, which will be held together with the locking pins 41. This will make a flexible member and one which will readily conform to the surfaces. In order to prevent lateral tilting of the rings and collapse of the mat, due to torsional moments on the insulator, the rings may preferably be in the form of small cylindrical sections so that they will not tip over under a torsional movement about the axis of the insulator. These members need not of course be complete cylinders providing they have enough free rotary movement to compensate for the distortion of the connected parts. It is also possible to provide a series of rolls as shown in Figs. 12 and 13. The rolls 42 may be in the form of small cylinders with longitudinal perforations through which holding members 43 can be passed. These holding wires pass through spacing strips 44 which are used to hold the axes of the rollers in proper alinement. The mat may be given any desired shape to fit the surface for which it is intended. The shape shown adapts the mat to a frustrum of a cone. By means of the small rod members 43 and spacer pieces 44, the rollers may be made up into a surface which will have any desired degree of flexibility or limit in strength. With this type of construction the stiffness of the rollers at the edges of the mat may be made considerably less than that of the center rollers to grade the stress. This may be readily brought about by varying the nature of the material used for making the rollers or by changing the stiffness of the shell by regulating the thickness. It is also possible to vary the diameter of the various roller members so as to control the stiffness or obtain any conformity for the bearing surface. These movable bearing mats may be given any desired rigidity and may bear directly upon the dielectric or main metal members or upon the cement or especially prepared bearing surface. In general, however, where cement which might crush or crumble is used, it is preferable to cover the bearing mat with a metal surface which will tend to distribute the stress upon the cement and prevent crumbling. While it is not necessary to hold all of the roller members together, this is generally advisable as the relative position will be maintained even though all the parts are not in contact under some conditions.

The several rollers may be held together by forming them with small necks connecting cylinder heads, similar to the general shape of a dumb-bell, as shown at 45 in Figs. 14 and 15. These will tend to lock each other into position longitudinally and by varying the length of the members in each zone forming a ring, it is possible to make them conform to practically any surface. When these are covered with a thin bearing envelope 46, they will be held in position. By using a thin metal layer for the envelope which will have a slight indentation, the members will be held in approximate position although there is no longitudinal locking member other than the meshing of the parts.

Another form of mat is shown in Figs. 16 and 17 in which a plurality of short cylinders 47 are arranged in rows; the cylinders being staggered in different rows and the whole enclosed in a thin sheet envelope 48.

Another form is shown in Figs. 18 and 19 in which the rollers 49 have interfitting parts by which they are held together. These may be used with spacers 44 shown in Figs. 12 and 13 or may be held by small projections 49' engaging perforations in the ends of adjacent rollers; the whole being enclosed in an envelope 50. The invention makes it possible to form an assembly which will not have an appreciable movement until the desired load is reached. The construction is such that tightness may be insured by relatively high assembly temperatures, providing provision is made so that the parts may move longitudinally of the axis of the insulator to compensate for stresses set up by uneven radial movement of the parts.

One effective way of forming a roller bearing mat is by the use of tubes interposed between the connected parts. Tubes for this purpose are illustrated in Figs. 20 to 25 inclusive. In Fig. 20 the tubes 51 are provided with reduced sections 52 at spaced intervals in order to permit the tubes to bend more easily into position to fit the insulator parts. A number of the tubes may be placed side by side, as shown in the drawings, with the enlarged portions meshing with the reduced portions and the mat thus formed may be enclosed in a thin envelope 53. The tubes may be formed with helical reduced portions, as shown at 54 in Figs. 22 and 24. The tubes may be meshed together as indicated in the drawings and may be alternate right and left hand helices, as shown in Fig. 22, or may all be threaded in the same direction, as shown in Fig. 24. The tubes will mesh more closer together if the alternate tubes are threaded in opposite directions, as shown in Fig. 22.

In Fig. 26 a grading of the stress is effected by a graded spacing of the spring coils 55. The central locking keys 56 may be made heavier than the outer keys 57 in order to effect a closer meshing of the coils at the central portion of the mat.

In the application of the invention shown in Fig. 3, the resilient mats 74, 75, 76 and 77 bear directly against the porcelain which is provided with inclined bearing surfaces so that the relative movement of the parts will compensate for any unequal distortion due to variations in load or temperature changes. With this type of construction, it is possible in some cases to eliminate the cement entirely, allowing the metal fittings and the porcelain to bear directly upon the rolling members; the resiliency of which takes care of any unevenness in the structure. The cap 78 may be slotted as shown at 79 to permit the edge of the cap to be spread to facilitate assembly of the parts with the mats in place. The slotted tongues are then bent inwardly against the mats and a reinforcing band 80 forced into place on the lower inclined step of the cap. This band may be placed over the porcelain 81 before the porcelain is inserted in the cap. A reinforcing winding of metal wire 82 may be wound about the second inclined step of the cap. These reinforcing members may be given initial tension if desired, as explained in my prior application Serial Number 529,000, filed April 10, 1931. The mats 76 and 77 may be placed within the respective steps inside the porcelain 81 and a cover sheet of thin metal 83 formed in place over the mats. The metal 83 should be hard enough to provide a suitable rolling bearing surface for the mats to rest upon. The pin 84 may then be cemented in place by cement 85.

In the embodiment shown in Fig. 4, a pressed metal cap 91 is provided with an inwardly extending supporting flange 92 at its lower edge, and a cup 93 of thin metal is secured to the dielectric member 94 by cement 95. The cup 93 is provided with an inwardly extending portion 96 and a roller mat 97 is interposed between the flanges 92 and 96. The flange 92 may be wrapped by reinforcing wires 58 for holding the flange in place. If desirable, the flange may be bent into position after the mat 97 is placed against the flange 96, and the wires 58 may then be wrapped about the flange 92 to hold it in place. A rib 59 may be formed at the lower ends of the flange 92 to hold the wires from slipping. The insulator pin 60 may be provided with one or more shoulders 61 with bearing mats 62 covered by an envelope 63 which is cemented to the portion 94.

Where insulator caps are made of pressed metal or other light material, the attachment to the supporting pin must be sufficiently strong to withstand the force of the load upon the insulator. Where a ball and socket joint is used, like that shown in my prior Patent Number 947,274 dated January 25, 1910, there is a force tending to split the socket in the top of the cap and where light material is used for the cap, this force may be in some cases great enough to cause the socket to open and permit the head of the supporting pin to be pulled away from the cap. To avoid this difficulty, the sheet metal cap 91, shown in Fig. 4, is provided with a heavier metal insert 64 having a socket 65 formed therein. The reinforcing member 64 may be spot welded, riveted or otherwise attached to the cap 91.

An arcuate rib 66 extends about the periphery of the opening in the top of the cap, through which the pin 67 extends and the pin is provided with an upwardly extending rib 68 which engages the rib 66 and extends into a groove 69 surrounding the rib 66. The bearing surfaces between the ribs 66 and 68 are formed on an arc 70 so that the cap 51 will have a limited universal movement about the center of the arc 70 to give the desired flexibility to the insulator string. The pin 67 is held in place by a cotter 71 in a well known manner. The cap 11, shown in Figs. 1 and 2, is provided with a socket similar to that shown in Fig. 4, and Figs. 1 and 2 show a top plan view and a section of the socket at right angles to the sections shown in Fig. 4. It will be seen that the rib 68 cooperates with the rib 66 to form a lock for preventing the cap from spreading under the force of the load on the insulator.

In some cases it may not be necessary to provide a reinforcing member 64 for the cap but sufficient strength may be imparted by turning the upper portion of the cap inwardly, as shown at 72, Fig. 5. The inwardly extending flange surrounding the opening for the pin provides a strengthening rib and, at the same time, gives a bearing surface for the head of the pin by which the cap may be locked from spreading.

In Fig. 3 the inwardly extending rib 73 is formed by continuing the flange downwardly and outwardly instead of providing a reverse bend, as in Fig. 5.

I claim:

1. In combination a pair of relatively movable parts having opposed bearing surfaces, and a bearing mat interposed between said surfaces and formed of a plurality of coil springs disposed side by side and interconnected.

2. In combination a pair of relatively movable parts having opposed bearing surfaces, and a bearing mat interposed between said surfaces and comprising coils of wire threaded together to hold said coils in position relative to one another.

3. An insulator comprising relatively movable bearing surfaces, one of which is of fragile material, and a plurality of roller bearings disposed side by side between said bearing surfaces and intermeshing with one another to permit the axes of said bearings to be spaced apart a distance less than the diameters of said bearings.

4. An insulator comprising relatively movable bearing surfaces, one of which is of fragile material, and a plurality of roller bearings disposed side by side between said bearing surfaces and connected together to form a roller mat movable as a unit between said surfaces while said bearings rotate individually about their respective axes.

ARTHUR O. AUSTIN.